United States Patent [19]

Peer, Jr.

[11] 4,254,173
[45] Mar. 3, 1981

[54] COMPOSITE MATERIAL FOR SECONDARY CONTAINER PACKAGING

[75] Inventor: A. Dean Peer, Jr., Parker, Colo.

[73] Assignee: Coors Container Company, Golden, Colo.

[21] Appl. No.: 961,955

[22] Filed: Nov. 20, 1978

[51] Int. Cl.³ .......................... B32B 3/00; B32B 23/08
[52] U.S. Cl. ..................... 428/204; 206/158; 206/160; 206/627; 428/205; 428/215; 428/507; 428/512; 428/513
[58] Field of Search ............... 428/215, 461, 507, 512, 428/513, 516, 203, 204, 205; 313/147; 328/233; 206/158, 160, 627

[56] References Cited

U.S. PATENT DOCUMENTS

| | | | |
|---|---|---|---|
| 3,086,651 | 4/1963 | Poupitch | 206/627 X |
| 3,603,501 | 9/1971 | Confer | 206/160 |
| 3,815,947 | 6/1974 | Olsen | 206/158 X |
| 3,935,364 | 1/1976 | Proksch et al. | 428/512 X |
| 3,972,468 | 8/1976 | Reid | 206/627 |
| 4,063,641 | 12/1977 | Kuehn et al. | 428/204 X |
| 4,079,328 | 3/1978 | Cleland et al. | 313/147 X |
| 4,105,820 | 8/1978 | Antoni | 428/461 X |

*Primary Examiner*—Thomas J. Herbert, Jr.
*Attorney, Agent, or Firm*—Bruce G. Klaas; Dennis K. Shelton; Richard D. Law

[57] ABSTRACT

A secondary container packaging material for use in six pack can wraps, six pack bottle carriers, twelve pack carriers, etc., comprising a composite of a paper material laminated to a plastic film. The plastic film provides tear resistance to the composite, so that paper material may be used which has a tear resistance less than that of other secondary packaging paper materials. The reduced tear resistance allows the use of paper having a lower caliper, basis weight, and, therefore, cost than conventional secondary container packaging material. Natural kraft paper and recycled paper of 12-16 point caliper are preferred for use with the present composite. The plastic film may be 0.25-2 mils thick and is preferably formed of polyethylene terpthalate, polyethylene, polyvinylchloride, polypropylene, or cellophane. The preferred films are transparent and permit reverse printing on their inner surface to provide abrasion resistant decoration visible through the film. Adhesives are used to bond the film to the paper and are selected to be compatible with the film used. The film may be metallized to produce a foil effect or may be strengthened by radiation treatment.

26 Claims, 3 Drawing Figures

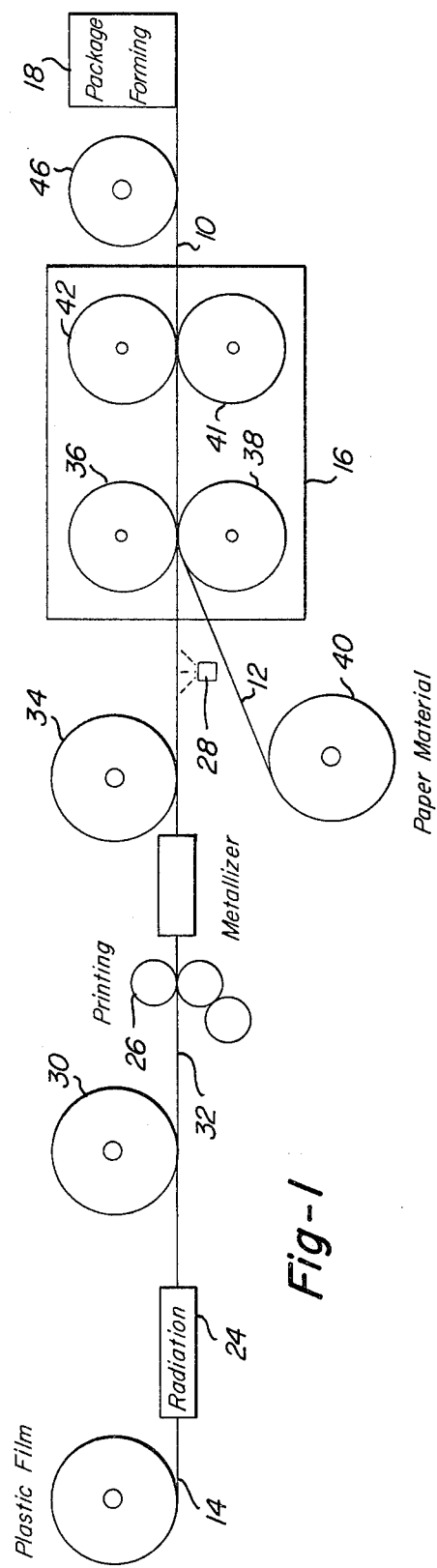
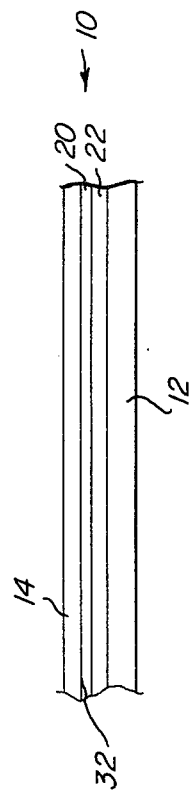

COMPOSITE MATERIAL FOR SECONDARY CONTAINER PACKAGING

BACKGROUND OF THE INVENTION

The present invention relates to container packaging and more particularly to sheet material for secondary container packaging.

The term "secondary container packaging" as generally understood in the industry and as used herein refers to packaging used in conjunction with primary containers, such as cans or bottles, which contain the ultimate product, such as beer or other beverages. Secondary container packaging includes container wraps which surround and support the containers, basket bottle carriers having bottom and side supports for the containers and an upwardly extending handle, 12-pack rectangular carriers completely enclosing the containers, and labels for application to the containers. Most secondary container packaging is made of paper, or paperboard, typically so-called carton or carrier board. Carrier board is specifically manufactured to be used for secondary container packaging. High strength is desired, so the board is usually produced from virgin, strong fiber and contains chemical additives to resist moisture. A smooth white surface is then coated on the carrier board with a white clay-titanium dioxide-latex mixture. The white surface is added to permit decoration of the naturally brown, rough surface of the carrier board. In some cases, as in the secondary container package described in U.S. Pat. No. 3,603,501, a white outer surface is provided through the lamination of an outer thin layer of high-quality label paper to a thicker backing material. Plastic is also used in some secondary container applications, such as in a bottle carrier formed from plastic sheet described in U.S. Pat. No. 3,815,947, and in webs of plastic rings fitted around the necks of beverage cans as described, for example, in U.S. Pat. No. 3,086,651.

The main objectives of secondary container packaging are shipping and handling strength and attractive consumer appearance. The two key aspects of packaging strength are tensile load strength, relating to the resistance of the material to diametrically opposed forces and tear strength, relating to the internal resistance of the material to tearing. Since the consumer purchases the packaging only incidentally to the container contents, these objectives must be met within the overriding criterion of cost.

SUMMARY OF THE INVENTION

The present invention provides a secondary container packaging material having an improved strength and appearance at a lower cost than conventional packaging material. This is done by laminating a paper material, such as kraft paper or recycled board, having an internal tearing resistance less than that required for the secondary container packaging material to a transparent film material having a tensile load less than that required for the secondary packaging material. The internal tearing resistance of the plastic film combines with the tensile load of the paper to create a composite material with strength properties exceeding those cost-comparable grades of either material alone. Furthermore, by reverse printing on plastic film, an attractive, glossy appearance can be created. The film also protects the printed material from abrasion damage during handling. The film may be strengthtned by radiation treatment.

The selection of specific paper materials and plastic films for the present composite will depend on cost and end use. In general, the preferred paper material is unbleached kraft paper or recycled paper of 12 to 16 point thickness. The preferred plastic film is extruded polypropylene or polyethylene. The preferred adhesive is extruded polyethylene. In the preferred embodiment, the present secondary container packaging material is formed into a 6-pack can wrap for 12 oz. beverage cans. Alternative embodiments include a 6-pack can wrap for 16 oz. beverage cans; a basket carrier for 12 oz. bottles; a 12-pack carrier for cans or bottles or an 8-pack carrier for cans or bottles; and a bottle label for various bottle sizes. The present process includes providing a web of paper material having an internal tearing resistance less than that required for a particular secondary container packaging application; providing a web of plastic film having a tensile load less than that required for the secondary container packaging application; printing on a first surface of the plastic film; applying an adhesive to the first surface of the plastic film; pressing the first surface of the film into intimate contact with the web of paper material to form a web of composite material; and forming the composite material into a secondary container package.

BRIEF DESCRIPTION OF THE DRAWING

FIG. 1 is a diagrammatic representation of the process of forming the composite material of the present invention;

FIG. 2 is an enlarged side view of the composite material of the present invention.

DESCRIPTION OF THE PREFERRED EMBODIMENT IN GENERAL

Figure 3:
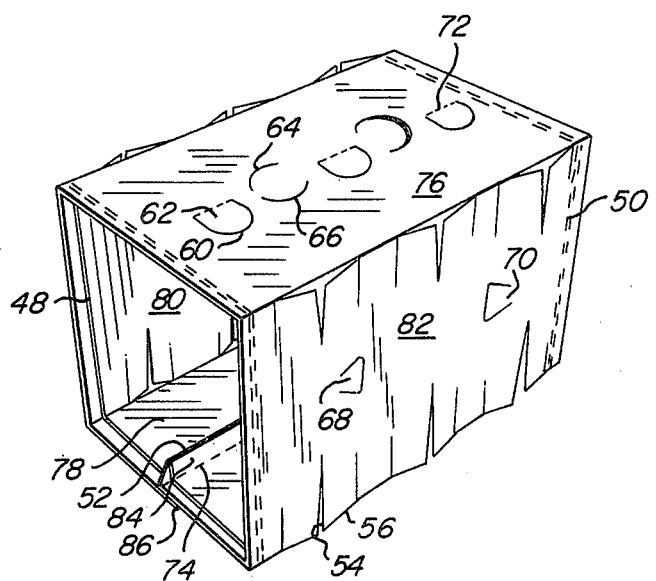
FIG. 3 is a perspective view of a secondary container packaging application of the composite material of the present invention.

Referring now to FIGS. 1 and 2, the composite 10 is formed in a continuous web from a web of paper material 12 and a web of plastic film 14 which are joined in a laminating apparatus 16. From the laminating apparatus 16, the composite is formed into a secondary container package in apparatus 18 for scoring, cutting, and folding the material.

Prior to entering the laminating apparatus 16, the plastic film 14 is pretreated in a radiation apparatus 24, decorated with a printed layer 20 in a conventional printing press 26, and coated with adhesive 22 to secure the film to the paper.

The radiation pretreatment unit 24 strengthens the plastic film by crosslinking polymer chains in the film to permit the use of thinner films in the composite material. Although the plastic film may be treated at any stage of the present process, initial radiation pretreatment improves the material handling properties of the plastic film during subsequent printing and laminating steps. The preferred pretreatment unit is of the type described in Cleland et al. U.S. Pat. No. 4,079,328, the description of which is hereby incorporated by reference. The radiation pretreatment unit, as described therein, is an electron accelerator having a number of cathodes arranged in parallel lines above a series of elongated electron windows. The material to be treated is moved in a continuous web transverse to the electron windows and receives a uniform exposure to a preselected dose of ionizing radiation. Radiation pretreatment is preferred in the present process for use with polyethylene films. Radiation pretreatment is not to be used with certain films such as those formed of polymers with two hydrogen atoms substituted on the same carbon atom, which are known to deteriorate when irradiated.

After pretreatment, the plastic film is collected in a roll 30 for further handling. From the roll 30, the web of plastic film is fed to a printing press 26 for applying decoration to a first surface 32 of the film. The printing may be carried out on a conventional printing press of the type used in printing paper, such as a rotogravure press. The printing may be carried out in one or more successive steps and may be either continuous or discontinuous, although a continuous layer of printing is preferred in that it serves to mask the natural brown color of the underlying paper material 12. Although conventional inks and dyes are generally considered unsatisfactory for printing smooth plastic surfaces due to the ease with which such inks could be lifted or rubbed off, such considerations are not critical to the present process, in that the printed layer is printed in reverse on the surface of the plastic film facing the paper material and is protected from abrasion by the paper and the plastic film. In general, conventional inks are selected which are compatible with the film used. The preferred printing process employs polyamide inks on a polyethylene film. Specialized inks and printing techniques involving solvent-or heat-softening of the film could also be used in the printing step.

After printing, the first surface 32 of the plastic film may be metallized. A metallizer, as is known in the art, comprises a high vacuum chamber through which a moving web of plastic film is passed. In the vacuum chamber, a thin, uniform layer of a coating metal is deposited on one or both surfaces of the moving web. The metal typically used is aluminum, although copper, silver, and gold can also be used in the process. The metal is vaporized in the high vacuum chamber and the metal vapor is caused to condense on the moving web of plastic film. The metal may be heated in a resistance-heated "boat" containing a small amount of the molten metal, or in an induction-heated crucible, or the vapor may be produced by electron beam evaporation or cathode sputtering. The metal is typically deposited on the web in a thin, uniform layer approximately 30 nm thick. The metallizing process is generally carried out as a semi-continuous process wherein an entire roll of plastic film is contained in the vacuum chamber, is unrolled to the vapor source, and rewound inside the vacuum chamber. Due to its low outgassing characteristics, polyester film is preferred for use in the metallizing process. Metalized 50 gauge (0.5 mil) polyester film, as well as 90 gauge polyvinylidene chloride (PVdC) coated cellophane film, 2 mil low density polyethylene (LDPE), 75 gauge oriented polypropylene (OPP), and 90 gauge PVdC coated OPP are available commercially.

The web of plastic film 14 is taken up on a roller 34 after printing of its first surface 32 and/or any metallizing treatment. From this roller 34, the film is passed to an adhesive applicator 28 and thence to the laminating apparatus 16. The adhesive applicator 28 applies the adhesive in a continuous or discontinuous layer by spraying, brushcoating, or rolling. The adhesive is applied to the first surface 32 of the film, over the printed layer 20. An offset gravure system can be used to apply a uniform pattern of adhesive dots to the film. Alternatively, the adhesive may be first applied to the paper material, the adhesive may be applied at a high temperature. The preferred adhesive for use with polyethylene film is a molten composition consisting essentially of polyethylene resin. Pigments and other additives may be added to the composition if desired, but the preferred adhesive composition has been found, surprisingly, to yield a high strength bond without the use of a solvent. The molten resin adhesive can be extruded across the width of the paper and film as they enter the nip between the laminating rollers, with one of the rollers being chilled to prevent excessive softening of the plastic film.

The adhesive composition is primarily chosen to be compatible with the plastic film 14. The adhesive compositions used may, apart from the polyethylene adhesive, generally be in solution or emulsion form and may be either water or organic solvent based.

In the laminating apparatus 16, the adhesive coated film 14 is fed to the nip of a first pair of opposed laminating rollers 36, 38 together with the web of paper material 12 from a paper supply roll 40. After the web or paper material 12 and the web of plastic film 14 are pressed together by the opposed rollers 36, 38 they pass to a second pair of opposed rollers 41, 42 which further press the two webs together to form the composite material 10. Heat is introduced to the laminating apparatus 16 to facilitate curing of the adhesive sandwiched between the plastic film and the paper material. The heating of the composite is controlled to prevent stretching or distortion of the printing on the film and is generally insufficient to heat seal the film. The heat may be provided by a heated first roller 36, by an infrared source between the two pairs of rollers, or by other means. The laminating process bonds the first surface 32 of the plastic film 14, which bears the continuous or discontinuous printed layer, through a continuous or discontinuous adhesive layer to the surface of the paper 12 which is intended to be outwardly facing in the secondary container packaging application.

From the laminating apparatus 16, the composite material 10 is collected on a roll 46 and then fed from this roll into a package forming apparatus 18 where the material is scored, cut, and folded into the particular secondary container packaging application contemplated. The preferred package forming apparatus 18 forms a web of composite material into a plurality of 6-pack 12 oz. can wraps as shown in FIG. 3. The wrapper of FIG. 3 is formed from a single blank of paper die cut from the composite web. Prior to cutting, strands 48, 50 are glued to the paper side of the composite along the machine direction of the composite web. The web of paper is then fed into a die cutting apparatus having a plurality of cutting edges. The arrangement of the cutting steps may be varied, but may suitably be carried out in one step as follows: as a web advances from left to right, a die cut is made which severs the web to form the edges of the blank and simultaneously cuts thin lines for the wrap. These lines include twelve pairs of intersecting perpendicular lines 54, 56 for receiving the rims of the cans contained in the wrap; arcuate slits 60 in an intermediate portion of the blank for forming can separation tabs 62; semi-elliptically opposed lines 64, 66 for forming package carrying holes; and machine finger slits 68, 70. Thin, broken, or scored, lines are also cut, including lines 72 across the arcuate slits 60 and a line 74 extending the width of the blank near its leading edge 52. The leading edge 52 of the blank is folded along the adjacent scored line 74 to form a center keel tab 84. The blank is then wrapped tightly about the containers through machine fingers extending through apertures formed by lines 68, 70 in the material. The carton is folded into a top surface 76 and a bottom surface 78, with side surfaces 80, 82 extending therebetween, and the trailing edge portion 86 is glued to the leading edge portion to complete the can wrap package.

THE PAPER MATERIAL

As used herein, the term "paper material" refers to a web of cellulosic fibers in sheet form, ranging from 0.0015–0.030 in. (0.03–0.080 mm) in thickness and having a density of 5–129 lbs. per 1,000 square feet (0.02–0.63 kg/sq. in.). This includes paper, which is generally 0.0015–0.008 in. (0.03–0.20 mm) thick, and paperboard, which is generally 0.008–0.030 in. (0.20–0.8 mm) thick.

As stated previously, the selection of a particular paper material will depend to a large extent on the secondary container end use intended. For example, for a 6-pack 12 oz. can wrap, the preferred paper material is 12–14 point natural kraft paper carrier board. The term "point" as generally understood in the industry and as used herein means a thickness of one thousanth of an inch for each point. Thus, 12 point paper is 0.012 in. (30.48 microns) thick. "Natural kraft paper" refers to kraft paper which has not been bleached to a white color or dyed. Kraft paper is paper produced by a chemical cooking process using sodium hydroxide and sodium sulfide. There are many different types of kraft paper manufactured with various additives and treatments for various applications, including the carrier board discussed above.

Another type of paper suitable for use with the present invention is recycled paper. Recycled paper may be defined as paper material which has been made using fibers which have previously been used in a paper product. There are a number of different types of recycled paper, including so-called cartonboard, folding cartonboard, and chipboard. Chipboard is paperboard made from recycled materials that were not repulped into individual fibers but only broken down to fiber bundles and then manfactured into board. Recycled paper is generally not used in secondary container packaging because it has low tear resistance due to the short fibers which it contains. Recycled paper may be used in the present invention, however, because of the tear resistance contributed by the plastic film.

The main factors in the selection of a paper material for use in the present invention are its tensile load and its internal tearing resistance. All types of paper are generally high in tensile load. Tensile load refers to the amount of force which a sheet of paper can withstand without ripping or bursting. It can be accurately measured by the Tensile Strength test, ASTM D 828-60. Tensile load is similar to tensile strength except that tensile load will vary with the thickness of the sheet being tested.

The tensile load of the paper used in the present composite should be 40 lbs. MD (Machine Direction)/30 lbs. CD (Cross Direction) minimum (177.92 N MD/133.44 N CD) for 6 packs, 12 oz. cans; 45 lbs. MD/35 lbs. CD minimum (200.16 N MD/155.68 N CD) for 6 packs, 16 oz. cans; 45 lbs. MD/35 lbs. CD (200.16 N MD/155.68 N CD) for 6 packs, 12 oz. bottle wraps; 45 lbs. MD/35 lbs. CD minimum (200.16 N MD/155.68 N CD) for 6 packs, 12 oz. basket bottle carriers and 40 lbs. MD/30 lbs. CD minimum (177.92 N MD/133.44 N CD) for 12 pack carriers. In other words, the combined tensile load, MD+CD, should be at least 70, generally 70–90 lbs. Since the plastic film used in the present composite is relatively elastic, the tensile load of the paper will contribute at least 85% of the tensile load of the composite. Internal tearing resistance refers to the average force in grams required to tear a single sheet of paper after the tear has been started. Internal tearing resistance is determined as described in TAPPI Standard T 414 ts-65 and Elmendorf, "Strength Test for Paper", *Paper* 26 (Apr. 21, 1930).

The internal tearing resistance, or tear strength, varies in a given paper sheet with the direction in which it is measured, being lower in the machine direction and higher in the cross machine direction. This is generally a result of the orientation of the paper fibers relative to the paper making machine from which the paper sheet issues. In some types of paper, such as that made by the Fourdrinier process, the tear resistance in the cross direction is generally 10–15% higher than that in the machine direction. In paper made with a cylinder machine, the tear resistance in the cross direction can be two times that of the machine direction. In secondary container packaging, tear strength in both directions is important. Accordingly, the internal tearing resistance herein considered is the combined tear strength obtained by adding the tear strength in both directions. It is generally considered that the minimum required combined tear strength for paper used in 6 pack 12 oz. can wraps is 500 gm; in 6 pack 16 oz. can wraps, 650 gm; in 6 pack 12 oz. bottle carriers, 650 gm; in 6 pack 12 oz. bottle wraps, 650 gm; and in labels, 40 gm.

Although not entirely so, the density, or basis weight and the thickness, or caliper of a paper material are indicative of the material's strength. For example, 12 point carrier board having a basis weight of 42 lbs/1000 ft$^2$ (hereinafter 42#) will generally have a combined internal tearing resistance of 250 to 400 gms. making it suitable for composites for 6 pack 12 oz. can wraps. Composite material using 12 point 42# carrier board and 0.75 ml polyethylene film was found to have a tensile strength of 50 lbs. MD and 30 lbs. CD and a combined tear resistance of 700 gms making it suitable for 6 pack 12 oz. can wraps wherein 18 pt., 700 gm tear resistance, 72# carrier board had previously been used. A composite package of 16 pt. 58#/42# carrier board and 0.75 ml polyethylene film has an approximate tensile strength of 55 lbs. MD/35 lbs. CD and combined tear resistance of 900 gms making it suitable for use on a 12 pack, 12 oz. can and bottle or a 6 pack 12 oz. bottle wrap, or a 6 pack 12 oz. basket bottle carrier wherein 20–23 point 79–91# claycoated carrier board having a tensile strength of 80–90 lbs. and a combined tear resistance of 900–1100 gms had previously been used.

It has generally been found that the film of the composite provides at least a 40%, and often an 80–90%, increase in tear strength over the tear strength of the paper material used. In other words, assuming that the tear strength of the composite is the sum of the tear strengths of the two materials, the plastic may be said to provide at least about 28% of the composite tear strength. The reduction in tear strength made possible by the present composite represents a considerable economic advantage, since tear strength, like stiffness, is closely ralated to the amount of fiber in the board, and hence its cost.

While the principal factors in the selection of the paper material according to the present invention are tensile load and internal tearing resistance, these factors must be considered, as stated previously, within the criterion of cost. Accordingly, other paper properties, as are known in the art, are also considered in the choice of the present paper material. An important consideration in this regard is the moisture content of the paper material. As is known, the moisture content affects the price, shrinkage, warpage, and physical strength of the paper. The paper material for use in the present composite should have a moisture content in the range of 4.0–8.5%.

The selection of a paper material for secondary packaging labels, such as bottle labels, is somewhat different than that of paper material for other package applications. Conventional labels are made from high-grade bleached kraft paper coated for printability. Abrasion resistance and stiffness are the important qualities in label paper, since tensile strength and tear resistance are only important to the paper handling during the label manufacturing process. In the present composite, abrasion resistance is provided by the film; stiffness is provided by a combination of the paper and the adhesive used to bond the paper to the film. It is still significant, however, that the present composite permits the use of paper having a tear strength less than that of conventional label paper, in that tear strength provided by the plastic film is sufficient for web handling during the manufacturing process. The present composite is also advantageous for use in labels in that no lacquer overcoat is required to impart a high gloss effect to the label.

THE PLASTIC FILM

The plastic film in the present composite provides a means for imparting additional tear strength and wet strength to the secondary container packaging material and a means for protecting printed decoration underneath. Surprisingly, it has been found that the specific polymer used is not critical to the functions of the plastic film. Thus films of polyethylene terpthalate, polyethylene, polyvinyl chloride, polypropylene, and cellophane have been evaluated and found structurally satisfactory. Polyvinyl chloride and polypropylene are less favored, however, as requiring more closely controlled manufacturing to produce films of sufficient clarity. It has also surprisingly been found that the thickness of the film is not critical to the functions of the film. Thicknesses from 0.25–2.0 mils can be employed in the present composite. Generally, however, films in the range of 0.75 mils thickness are preferred.

The most important physical property contributed by the plastic film is its tear resistance. The tear resistance of plastic film is variable with direction in the film depending on whether or not and in which direction the film is oriented. In oriented films, the polymer chains tend to be aligned along the direction of orientation and the tear strength will be proportional to the degree of orientation achieved. The orientation direction and magnitude of a film is a function of the method by which the film was produced. Unoriented film may be fabricated by systems including calendering, solution or monomer casting, and extrusion. Oriented film may be made by extrusion processes including tubular die blown, cast, and slit die processes.

It has been found, for purposes of the present composite, that both oriented and unoriented films will fulfill the structural functions of the plastic film. Therefore, the preferred films for the present invention have been selected on an economic basis. The presently preferred plastic films are tubular die blown polyethylene and polypropylene. Polyethylene is also preferred as imparting a high gloss to the composite material and being amenable to radiation-induced crosslinking.

The selection of a type of polymer film produced to a certain thickness by a particular process will, apart from economic considerations, primarily be determined by the tear resistance of the film. The following films provided the necessary tear resistance and have been found structurally satisfactory in the present composite:

| Material | Load, lb (N) MC/CD, ASTM D882 | Tear Resistance MD/CD ASTM D1922 |
| --- | --- | --- |
| POLYETHYLENE, Consolidated Thermoplastic Co., LGF11, .75 mil, | 1.16/0.80 (5.15/3.55)N | 238/120 |
| 1.0 mil. | 1.44/0.86 (6.40/3.82)N | 282/254 |
| POLYPROPYLENE, Hercules Chem. Corp. B503 .5 mil | 5.01/4.69 (22.28/20.86)N | 8/6 |
| .25 mil | 14.81/11.63 (65.87/51.73)N | 10/13 |
| POLYETHYLENE TERTHALATE, Celenese Corp., .48 mil | 4.66/5.08 (20.72/22.59)N | 8/10 |
| .92 mil | — | 16/16 |
| CELLOPHANE, Dupont, 75 LBT, .75 mil | 6.48/8.60 (28.82/38.25)N | 13/20 |
| VINYL, Goodyear, LPC-60 .60 mil | 1.23/0.79 (5.47/3.51)N | 693/376 |
| ALC - 75, .75 mil | 1.47/1.13 (6.53/5.02)N | 734/446 |

It will be noted from the above table that the tensile loads of the plastics there listed are far below that required for secondary container packaging applications, the tensile load in the composite being supplied mainly by the paper. It may also be noted that the tear resistances of a number of plastic films are themselves relatively low. It has been found that the tear strength of the composite is in excess of that expected from an addition of the tear strengths of the plastic film and the paper. While not completely understood, it is thought that the interface between the paper material, adhesive, and film provides the unexpected increase in tear resistance.

Thus there has been provided a composite secondary packaging sheet material which is lower in cost but higher in strength than conventional secondary paper packaging materials. Furthermore, the composite material provides a glossy, more attractive appearance and permits a variety in printing or decoration, such as foil appearance, and is highly abrasion resistant and high in wet strength. The manufacturing of the present composite can utilize polyethylene film with radiation treatment and molten polyethylene adhesive for further cost savings.

While the inventive concepts have been disclosed herein with reference to an illustrative and presently preferred embodiment thereof, it is intended that the appended claims be construed as including alternative embodiments, except insofar as limited by the prior art.

What is claimed is:

1. A secondary container packaging material, having an internal tearing resistance and a tensile load selected for a particular packaging application, consisting essentially of:
   an inner paper material providing at least 85% of said tensile load;
   an outer decorative plastic film, laminated to said paper material, and providing at least 28% of said tearing resistance; and
   an adhesive layer between said plastic film and said paper material for bonding said plastic film to said paper material.

2. The material of claim 1, wherein said plastic material is plastic film 0.25–2 mils thick.

3. The material of claim 1, wherein said paper material is natural kraft paper 0.012 to 0.016 in. thick.

4. The material of claim 1 wherein said plastic film is polyethylene.

5. The material of claim 4, further comprising:
   an adhesive layer between said paper material and said plastic film consisting essentially of polyethylene resin.

6. A secondary container packaging label material consisting essentially of:
   a natural kraft paper material;
   a transparent plastic film laminated to said paper material through an adhesive layer; and
   a layer of printing on the plastic film visible in reverse through the plastic film.

7. A secondary container packaging material consisting essentially of:
   a paper material having an internal tearing resistance less than that required for said secondary container packaging material;
   a transparent plastic film having a tensile load less than that required for said secondary container packaging material;
   said plastic film being laminated to said paper material through an adhesive layer; and
   a layer of printing on the plastic film visible in reverse through the plastic film.

8. The material of claim 7 wherein said paper material is 0.012–0.016 inches thick.

9. The material of claim 7 wherein the paper material is 0.012–0.014 inch thick natural kraft paper.

10. The material of claim 7 wherein said paper material is natural kraft paper.

11. The material of claim 7 wherein said paper material is recycled paper.

12. The material of claim 11 wherein said plastic film is polyethylene.

13. The material of claim 7 wherein said plastic film is polyethylene and said adhesive consists essentially of molten polythylene.

14. The material of claim 13 wherein said polyethylene film is blown film.

15. A packaging material for providing an outer decorative wrap enclosing a plurality of individual containers in a multiple container package comprising:
   an innermost layer of paper material adapted to be located adjacent and in intimate supporting contact with the individual containers;
   an outermost layer of relatively thin, transparent plastic film material;
   a decorative image permanently affixed to the inner surface of the plastic film material and being visible through the outer surface thereof, the thickness of the film material protecting the image against abrasion by objects located in contact with the outer surface of said film material during handling and shipment of the multiple package container; and
   an adhesive material affixed to the image containing surface of said plastic film and the outer surface of said innermost layer of paper material permanently affixing said plastic film material to said paper material without diminishing the visibility of said image, the paper material, plastic film material, and adhesive material of the packaging material being selected to provide in combination sufficient tensile load and tear strength to enable the multiple container package formed therefrom to support the collective weight of the individual containers therein without additional sheet materials.

16. The packaging material of claim 15 wherein said adhesive material consists essentially of polyethylene resin.

17. The packaging material of claim 15 wherein said paper material is either recycled paper or natural kraft paper.

18. The packaging material of claim 15 wherein said film material is tubular die blown polyethylene or polypropylene.

19. The packaging material of claim 18 wherein said film material is 0.25–1.0 mil thick.

20. The packaging material of claim 17 wherein said film material is tubular die blown polyethylene or polypropylene.

21. The packaging material of claim 20 wherein said film material is 0.25–1.0 mil thick.

22. The material of claim 1, 6, 7 or 15 wherein said plastic film has a foil appearance imparted by a metallizing treatment.

23. The material of claim 1 or 15 wherein said tear strength is 500–650 gm and said tensile load is 70–90 lbs.

24. The material of claim 7 or 15 wherein said plastic film is treated with radiation.

25. The packaging material of claim 15 or 17 wherein said paper material is between 12 and 16 points in thickness.

26. The material of claim 9 or 10 or 24 wherein said plastic film is selected from the group consisting of: polyethylene terpthalate, polyethylene, polyvinylchloride, polypropylene, and cellophane.

* * * * *